US010532322B2

(12) United States Patent
Chu et al.

(10) Patent No.: US 10,532,322 B2
(45) Date of Patent: Jan. 14, 2020

(54) ELASTIC MEMBRANE-BASED MEMBRANE BIOREACTOR WITH HIGH-EFFICIENCY FOR FOULING CONTROL

(71) Applicant: The Research Foundation for the State University of New York, Albany, NY (US)

(72) Inventors: Benjamin Chu, Setauket, NY (US); Benjamin S. Hsiao, Setauket, NY (US); Ying Su, Stony Brook, NY (US)

(73) Assignee: The Research Foundation for the State University of New York, Albany, NY (US)

( * ) Notice: Subject to any disclaimer, the term of this patent is extended or adjusted under 35 U.S.C. 154(b) by 88 days.

(21) Appl. No.: 15/325,453

(22) PCT Filed: Jul. 15, 2015

(86) PCT No.: PCT/US2015/040525
§ 371 (c)(1),
(2) Date: Jan. 11, 2017

(87) PCT Pub. No.: WO2016/011128
PCT Pub. Date: Jan. 21, 2016

(65) Prior Publication Data
US 2017/0157565 A1    Jun. 8, 2017

Related U.S. Application Data

(60) Provisional application No. 62/025,545, filed on Jul. 17, 2014.

(51) Int. Cl.
*B01D 61/14* (2006.01)
*B01D 69/02* (2006.01)
(Continued)

(52) U.S. Cl.
CPC ............. *B01D 61/14* (2013.01); *B01D 63/08* (2013.01); *B01D 65/08* (2013.01); *B01D 69/02* (2013.01);
(Continued)

(58) Field of Classification Search
None
See application file for complete search history.

(56) References Cited

U.S. PATENT DOCUMENTS 4,101,423 A * 7/1978 Merrill .................. B01D 29/111
210/494.1
4,769,263 A   9/1988 Bitter
(Continued)

FOREIGN PATENT DOCUMENTS

WO    2006044712 A1    4/2006
WO    2013103765 A1    7/2013

OTHER PUBLICATIONS

Fouling charcteristic of polyurethane-based hollow fiber membrane in microfiltration process—Liu, Meitian et al—Desalination, 2012 (Year: 2012).*
Internaitonal Search Report and Written Opinion from PCT/US15/40525 dated Oct. 6, 2015.

*Primary Examiner* — Bradley R Spies
(74) *Attorney, Agent, or Firm* — Carter, DeLuca & Farrell LLP

(57) ABSTRACT

Elastic microfiltration membranes are provided. These membranes may be used in a membrane bioreactor. Due to the elastic nature of the membranes, removal of fouling materials is improved, thereby increasing the efficiency and longevity of the membranes. Methods for forming such membranes and uses of the membranes are also provided, including their use in membrane bioreactors.

13 Claims, 11 Drawing Sheets

(51) Int. Cl.
    *B01D 69/10*     (2006.01)
    *B01D 65/08*     (2006.01)
    *B01D 71/06*     (2006.01)
    *B01D 71/24*     (2006.01)
    *B01D 71/52*     (2006.01)
    *B01D 63/08*     (2006.01)
    *C02F 3/12*     (2006.01)
    *C02F 103/00*     (2006.01)

(52) U.S. Cl.
    CPC .............. *B01D 69/10* (2013.01); *B01D 71/06* (2013.01); *B01D 71/24* (2013.01); *B01D 71/52* (2013.01); *C02F 3/1273* (2013.01); *B01D 2313/146* (2013.01); *B01D 2315/06* (2013.01); *B01D 2325/24* (2013.01); *C02F 2103/001* (2013.01); *C02F 2203/006* (2013.01); *C02F 2303/20* (2013.01); *Y02W 10/15* (2015.05)

(56) References Cited

U.S. PATENT DOCUMENTS

| | | | |
|---|---|---|---|
| 5,846,421 A | 12/1998 | Ohtani | |
| 6,514,412 B1* | 2/2003 | Insley | A61M 1/008 210/321.75 |
| 2004/0191894 A1* | 9/2004 | Muller | B01D 67/0018 435/297.1 |
| 2010/0072124 A1* | 3/2010 | Morikawa | B01D 63/02 210/321.79 |
| 2010/0323573 A1 | 12/2010 | Chu et al. | |
| 2011/0168628 A1 | 7/2011 | Matsuyama et al. | |
| 2012/0145626 A1* | 6/2012 | Luttropp | C12M 21/08 210/500.37 |
| 2012/0193284 A1* | 8/2012 | Koo | B01D 67/00 210/500.21 |
| 2013/0126349 A1 | 5/2013 | Zhang | |

\* cited by examiner

Distribution Shape Comparison

Cross-section view of pore size distribution at y=0.008mm

Cross-section view of pore size distribution at y=x (diagonal)

ELASTIC MEMBRANE-BASED MEMBRANE BIOREACTOR WITH HIGH-EFFICIENCY FOR FOULING CONTROL

CROSS REFERENCE TO RELATED APPLICATIONS

This application is a National Stage of, and claims priority to and the benefit of, International Patent Application No. PCT/US2015/040525 filed on Jul. 15, 2015, which, in turn, claims the benefit of, and priority to, U.S. Provisional Patent Application Ser. No. 62/025,545, filed on Jul. 17, 2014, the entire disclosures of each of which are incorporated by reference herein.

BACKGROUND

Membrane bioreactors are designed to remove contaminants from wastewater. This wastewater can come from residences, businesses, industries, and runoff water from rainfall and/or flooding. A membrane bioreactor ("MBR") employs micro-filters (membranes) that separate clean water from solid waste, sludge, and other contaminants. First, the water is biologically treated in an aerobic process by microorganisms that consume the organic contaminants in the water and produce solid waste sludge. Then, the water is drawn through the micro-filters, which separate the water from the sludge. The clean water is then pumped out of the micro-filters.

Current commercial membranes used in membrane bioreactors are composed of a polyvinylidene fluoride (PVDF) barrier layer and a PET non-woven fabric substrate, both of which materials are non-elastic or have little elasticity. Layers of fouling particles will often build on the membrane surface, so keeping these membranes clean is a constant concern. Fouling can be divided into reversible and irreversible fouling, based on the attachment strength of particles to the membrane surface. Membrane fouling that can be removed by hydraulic cleaning, such as backwashing and/or gas scouring, is defined as reversible fouling. A backwashing process involves reversing filtrate flow to dislodge foulants that have accumulated on the membrane surface and in the pores.

For currently available membranes, only the loosely attached foulants (i.e., sludge flocs and colloids with larger sizes than the pore sizes of the membrane), can be removed during the backwash process. By contrast, those particles, colloids and solutes that are comparable or smaller than the pore sizes can easily get stuck in the pores or be attached to the pore wall, and cannot be removed by simple physical cleaning. In this case, harsh chemical treatment is often used to cleanse the fouling. However, repeated uses of aggressive chemical cleaning can accelerate membrane deterioration and shorten the membrane lifetime. In addition, the disposal of toxic and caustic spent chemicals is an environmental problem itself. More importantly, it has been demonstrated that even for long term chemical cleaning, only the fouling on the surface of the membrane can be removed, while the fouling that is caused by depth filtration still remains in the membrane, making the fouling irreversible.

Improved membranes for use in MBR systems remain desirable.

SUMMARY

The present disclosure provides membranes suitable for filtration and separation applications. In embodiments, elastic microfiltration membranes are provided. Methods for forming such membranes and uses of the membranes are also provided, including their use in membrane bioreactors. Due to the elastic nature of the membranes, removal of fouling materials is improved, thereby increasing the efficiency and longevity of the membranes.

In embodiments, a membrane module of the present disclosure, suitable for use with a membrane bioreactor, may include a first perforated support member; a non-woven substrate adjacent the first perforated support member; an elastic microfiltration membrane adjacent the non-woven substrate; and a second perforated support member adjacent the elastic microfiltration membrane.

In embodiments, the elastic microfiltration membrane may include a material such as polyether-based thermoplastic polymers, polyether block amides, polyetherimides, silicone rubber, poly (styrene-butadiene-styrene), polybutadiene rubber and combinations thereof.

In embodiments, the elastic microfiltration membrane has a thickness from about 20 μm to about 800 μm, pores possessing average sizes from about 100 nm to about 1.5 μm in diameter, and fibers having a mean fiber diameter from about 40 nm to about 500 nm.

In embodiments, the elastic microfiltration membrane has a Young's modulus from about 0.01 MPa to about 50 MPa.

The first perforated support member, the second perforated support member, or both, may possess square openings. In other embodiments, the first perforated support member, the second perforated support member, or both, possess circular openings. The circular openings on the first perforated support member, the second perforated support member, or both, may be at least two different sizes. In yet other embodiments, the first perforated support member, the second perforated support member, or both, possess hexagonal openings.

The openings of the first perforated support member, in embodiments, may be larger than the openings of the second perforated support member.

Membrane bioreactors including the membrane module of the present disclosure are also provided.

BRIEF DESCRIPTION OF THE DRAWINGS

Various embodiments of the present disclosure will be described herein with reference to the following figures, wherein:

FIG. 9c is an enlarged view of the elastic microfiltration membrane of the present disclosure protruding through a perforated support member encasing the membrane;

DETAILED DESCRIPTION

A novel class of flat sheet membranes, composed of (electrospun) elastic microfiltration ("MF") membranes and a non-woven (elastic) substrate can be used in a membrane bioreactor ("MBR") system to improve the fouling removal efficiency of an MBR system including the MF membranes.

Figure 1:
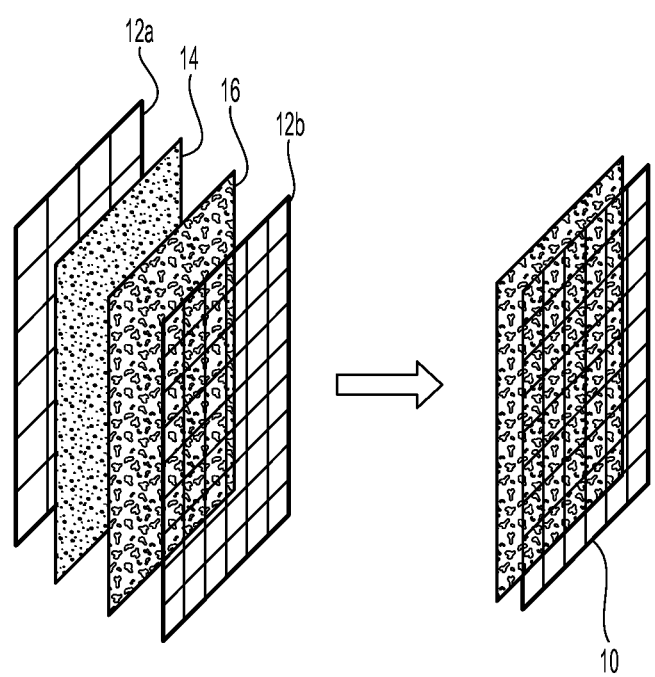
FIG. 1 shows the components of a membrane module of the present disclosure.

A very important part of any MBR system is the membrane module, which includes several components. The present disclosure provides new flat sheet elastic microfiltration membranes for the membrane module. Specifically, each membrane module includes four components as depicted in FIG. 1: a stainless steel perforated support member 12, a non-woven substrate 14, an elastic microfiltration membrane 16, and another stainless steel perforated support member 12b. The non-woven substrate 14 may be with or without slight elasticity, and the two stainless steel perforated support members 12a, 12b have hole sizes that are selected while considering the elasticity of the microfiltration membrane and applied pressures to be used with the MBR system.

The substrate provides support for the elastic microfiltration membrane during the filtration process. As noted above, the non-woven substrate may be elastic or inelastic. Suitable materials for use as the substrate include, for example, polyolefins including polyethylene and polypropylene, polyesters including polyethylene terephthalate, polytrimethylene terephthalate and polybutylene terephthalate, polyamides including nylon 6, nylon 66, and nylon 12, polyurethanes, fluorinated polymers, polyetherketones, polystyrene, sulfonated polyetherketones, sulfonated polystyrene and derivatives thereof, cellulose and derivatives thereof, chitin/chitosan and derivatives thereof, and copolymers thereof. In some embodiments, a dense polyester non-woven layer, such as commercially available non-woven substrates made of polyethylene terephthalate (PET), may be used as the substrate.

In embodiments, the substrate may have a thickness from about 20 μm to about 1000 μm, in other embodiments from about 50 μm to about 200 μm.

The substrate may have a bulk density from about 0.3 g/cm$^3$ to 1.5 g/cm$^3$, in embodiments from about 0.5 g/cm$^3$ to 0.8 g/cm$^3$.

The second component of the membrane group of the present disclosure is an elastomer membrane, sometimes referred to herein, in embodiments, as an elastic microfiltration (MF) membrane. Suitable materials for forming these elastic microfiltration (MF) membranes include, for example, polyether-based thermoplastic polyurethanes, polyester-based thermoplastic polyurethanes and polycaprolactone-based thermoplastic polyurethanes (TPU) (e.g., those sold under the trade names HydroThane (AdvanSource Biomaterials), Elastollan (BASF & Elastogran), Pearlthane, Pellethane and Estane (Lubrizol), Desmopan (Bayer), Avalon and Irogran (Huntsman), Exelast EC (Shin-Etsu Polymer Europe B.V.), Laripur (COIM SpA), Zythane (Alliance Polymers & Services)), polyether block amides (e.g., those sold under the trade name PEBAX® (Arkema Group of Colombes, France)), polyetherimides (e.g., those sold under the trade names ULTEM® and/or EXTEM® (SABIC Innovative Plastics of Saudi Arabia)), silicone rubber, poly(styrene-butadiene-styrene), polybutadiene rubber, combinations thereof, and the like.

In embodiments, polyether-based thermoplastic polyurethanes, with good hydrophilicity, may be used to form the elastic microfiltration (MF) membranes of the present disclosure.

Elastic microfiltration membranes may be formed using methods within the purview of those skilled in the art. One approach for preparing these membranes is by means of electrospinning. For materials used in forming elastic membranes, there are two factors that need to be considered. On the one hand, since conventional rubbers are very difficult to electrospin (due to their low glass transition temperatures (Tg)), to facilitate the electrospinning process and the elasticity needed for the membranes of the present disclosure, it may be desirable to use relaxed, thermoplastic elastomers, being a type of copolymer that has both rubbery and thermoplastic characteristics, for the fabrication of such membranes for use with an MBR system. In addition, to be used in the MBR system, the membrane should have hydrophilic and bio-resistant properties.

In forming the elastic microfiltration (MF) membrane of the present disclosure, the polymer is often first placed in a solvent, such as dimethylacetamide (DMAc), tetrahydrofuran (THF), N,N-dimethyl formamide (DMF), methylene chloride, dioxane, ethanol, propanol, butanol, chloroform, water, or mixtures of these solvents, so that the polymer is present at an amount from about 1 to about 40 wt %, in embodiments from about 3 to about 20 wt %, in embodiments from about 5 to about 15 wt % of polymer solution.

In some embodiments, it may be desirable to add a surfactant or another solvent-miscible liquid to the polymer solution utilized to form the elastic microfiltration membrane to lower the surface tension of the solution, which may help stabilize the polymer solution during electro-spinning. Suitable surfactants include, for example, octylphenoxypolyethoxy ethanol (commercially available as TRITON X-100), sorbitan monolaurate, sorbitan sesquioleate, glycerol monostearate, polyoxyethylene, polyoxyethylene cetyl ether, dimethyl alkyl amines and methyl dialkyl amines, and the like. Where utilized, the surfactant may be present in an amount from about 0.001 to about 10 percent by weight of the polymer solution, in embodiments from about 0.05 to about 5 percent by weight of the polymer solution, in embodiments from about 0.1 to about 2 percent by weight of the polymer solution. The solvent miscible fluid forms a solvent mixture with the solvent that can dissolve the polymer but changes the surface tension of the polymer solution and the evaporation rate of the solvent mixture.

In embodiments, the elastic microfiltration (MF) membrane may be fabricated using electro-spinning, and/or blowing-assisted electro-spinning technologies. Blowing-assisted electro-spinning uses electric force and gas-blowing shear forces. In blowing-assisted electro-spinning processes, the electric force is the dominating factor, while the gas-blowing feature can assist in shearing the fluid jet stream and in controlled evaporation of the solvent (lower throughput, smaller diameter). Electro-spinning processes use only electric force, but without the assistance of gas flow.

The applied electric field potentials utilized in electro-spinning can vary from about 10 to about 40 kV, in embodiments from about 15 to about 30 kV, with a distance between the spinneret and the collector of from about 5 to about 20 cm, in embodiments from about 8 to about 12 cm, and a solution flow rate of from about 10 to about 40 µl/minute, in embodiments from about 20 to about 30 µl/minute. In embodiments the electrospinning process can use an applied electric field strength of about 2 kV/cm and a solution flow rate of about 25 µl/minute.

Multiple jet electro-spinning instrumentation may be used to fabricate high-quality electro-spun microfiltration membranes having controlled fiber diameter and effective pore sizes, as well as pore size distribution, with all such parameters being variables across the membrane thickness. A multiple jet electro-spinning instrumentation may be used to deposit layers of materials with different fiber diameters, pore sizes, and surface properties to fabricate such an asymmetric membrane.

Smaller units with 4-8 jets may also be used for initial fabrications of electro-spun microfiltration membranes. Variation of fiber diameters during deposition and changes in surface activity permit one to form asymmetric wettability during the electro-spinning process. These features can facilitate the fabrication of different specific barrier layers having predesigned parameter values and to adjust the fundamental factors in the microenvironment for the vapor/liquid phase transition in the microfiltration membrane.

Where the elastic microfiltration (MF) membrane is formed by blow-assisted electrospinning, the feeding rate of the polymer solution per spinneret for forming the microfiltration membrane may be from about 5 to about 150 µL/minute, in embodiments from about 10 to about 80 µL/minute, in embodiments from about 20 to about 50 µL/minute. The air blow temperature may be from about 0° C. to about 200° C., in embodiments from about 20° C. to about 120° C., in embodiments from about 25° C. to about 90° C. The air blow rate per spinneret may vary from about 0 standard cubic feet per hour (SCFH) to about 300 SCFH, in embodiments from about 5 SCFH to about 250 SCFH, in embodiments from about 20 SCFH to about 150 SCFH. The electric potential can be from about 1 kV to about 55 kV, in embodiments from about 10 kV to about 50 kV, in embodiments from about 20 kV to about 40 kV, with a conventional spinneret to collector distance of about 10 cm.

The effective mean pore size and the mean fiber diameter of the electro-spun microfiltration membranes over a large range of length scales may be controlled.

The elastic microfiltration membrane may have mean fiber diameters from about 40 nm to about 500 nm, in embodiments from about 80 nm to about 400 nm.

The elastic microfiltration membrane may have pores possessing average sizes from about 100 nm to about 1.5 µm in diameter, in embodiments from about 200 nm to about 1.3 µm in diameter.

In embodiments, the elastic microfiltration membrane may have a thickness from about 20 µm to about 800 µm, in other embodiments from about 40 µm to about 200 µm.

The elastic microfiltration membrane may have an elasticity as described by its Young's modulus. The Young's modulus of the elastic microfiltration membrane of the present disclosure may be from about 0.01 MPa to about 50 MPa, in embodiments from about 0.05 MPa to about 45 MPa.

The elastic microfiltration membrane may have a highly reversible elongation rate, in embodiments from about 30% to about 600%, in other embodiments from about 100% to about 300%.

Returning to FIG. 1 in greater detail, a membrane module 10 is depicted, having an elastic microfiltration membrane 16 and a non-woven substrate 14 sandwiched by two stainless steel perforated support members 12a, 12b. Generally, the size of the openings of the perforated support member 12a adjacent the non-woven substrate 14 is larger than the openings of the perforated support member 12b adjacent the elastic microfiltration membrane 16, because the elasticity of the non-woven substrate 14 is much less than that of the elastic microfiltration membrane 16. Therefore, the former needs less support than the latter.

As the dimensions of both the elastic microfiltration membrane 16 and the non-woven substrate 14 are about 500×1600 mm (width×height), two stainless steel perforated support members 12a, 12b, sandwiching the substrate and microfiltration membrane, are needed to provide support during the filtration and backwash processes used with the MBR, including this membrane module.

The design of the perforated support members 12a, 12b is important for the whole membrane module 10, because the shape and size of the perforated support members will directly influence the distortion and the pore size distributions of the elastic microfiltration membrane 16. In addition, the shape and arrangement of the openings on the perforated support members will determine the area utilization of the membrane.

Therefore, to estimate the proper sizes of the openings and to maximize the area utilization of the membrane, the relationship between the membrane distortion and the sizes of the openings on the perforated support member, as well as the comparison of different shapes of openings, include the following.

Specifically, the shape and size of the openings on the perforated support member can vary, depending on the mechanical properties of the membrane (e.g. the thickness of the membrane, the Young's modulus, and the Poisson ratio). With given properties of the membrane and the trans-membrane pressure information, the membrane protrusion through the openings of the perforated support members at any point of the membrane can be calculated by using the Kirchhoff-Love plate theory, and therefore the pore size distribution of the membrane under pressure can be determined.

For all calculations below, the following parameters based on a TPU membrane were employed:
Young's modulus: $E=0.8$ MPa
Poisson ratio for rubber: $\nu=0.5$
Thickness of the electrospun membrane: $H=200$ µm
Trans-membrane pressure $q=50$ Pa For circular openings, at any point on the membrane, if the distance between its projection on the X-Y plane and the center of the X-Y plane is r, then the distortion along the Z direction is w(r):

$$w(r) = -\frac{q}{64D}(R^2 - r^2)^2$$

$$D = \frac{2(H/2)^3 E}{3(1-\upsilon^2)}$$

where q is the pressure applied on the membrane; R is the radius of the opening with circular shape on the perforated support member; H is the thickness of the membrane; E is the Young's modulus; v is the Poisson ratio.

Assuming the trans membrane pressure q=50 Pa, when the radius R=0.8 cm, the maximum protrusion length w(r) at the circle center will be 0.45 cm.

For the distorted membrane clamped on a circular frame, the in-plane strain along the tangent direction in the membrane is:

$$\varepsilon_{\theta\theta} = -\frac{qw(r)}{16D}(R^2 - r^2)$$

For example, when the radius R=0.8 cm, the maximum protrusion length w(r) at circle center was calculated to be 0.45 cm. At this point (circle center), the in-plane strain along the tangent direction is 125%.

Assuming the relationship between pore size and fiber length is a linear relationship, then the pore size increase at the circle center will also be 125%.

With square openings on the perforated support member, at any point on the membrane, if the coordinate of the projection on the X-Y plane is (x, y), then the distortion along the Z direction is w(x, y):

$$w(x, y) = -\frac{4q}{D\pi^6}\left(\frac{2}{a^2}\right)^{-2} \sin\left(\frac{\pi x}{a}\right)\sin\left(\frac{\pi y}{a}\right)$$

where q is the pressure applied on the membrane; D is the constant related to the mechanical properties of membrane; a is the edge length of the square frame.

Figure 2A:
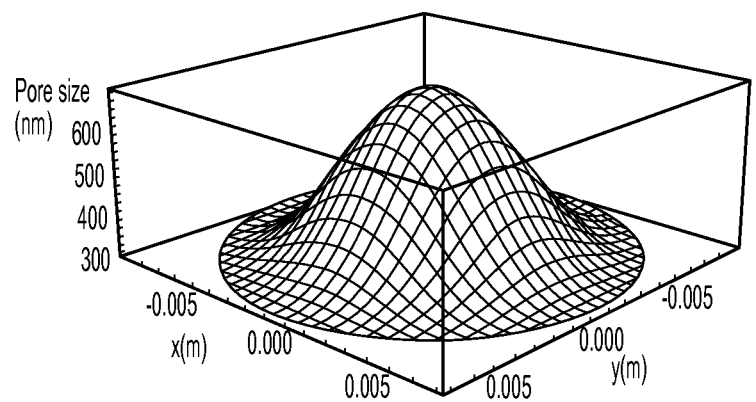
FIGS. 2a and 2b show pore size distributions of the elastic microfiltration membrane of the present disclosure for use with a perforated support member having circular openings (FIG. 2a) or a perforated support member having square openings (FIG. 2b), respectively.
Figure 2B:
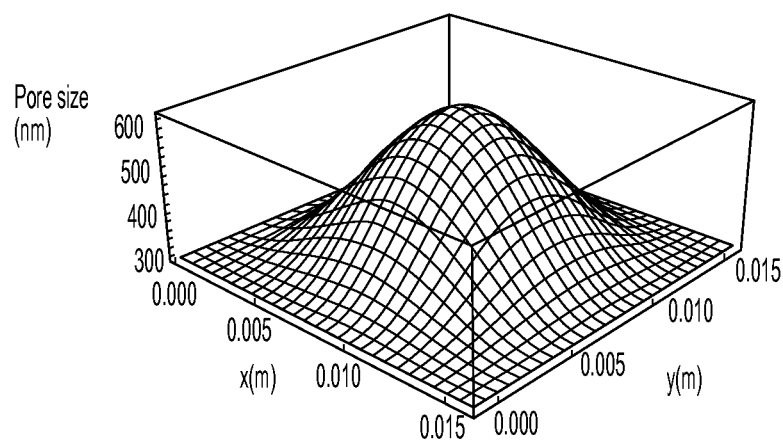

Assuming the trans membrane pressure q=50 Pa, and the edge length of the square opening is 1.6 cm, the maximum protrusion length w(r) at the center of membrane is 0.48 cm For example, assuming the average pore size of the electrospun elastic membrane without deformation is 300 nm, the thickness of the membrane is 200 µm, the Young's modulus is 0.8 MPa, the Poisson ratio of the material is 0.5, and the trans-membrane pressure of the backwash is 50 Pa, if the openings on the perforated support member are of circular shape with a diameter of 1.6 cm, the maximum protrusion of the membrane will be 0.45 cm, and the pore size distribution is shown in FIG. 2a; if the openings on the perforated support member are of square shape with an edge length of 1.6 cm, the maximum protrusion will be 0.48 cm, and the pore size distribution is shown in FIG. 2b.

Figure 3A:
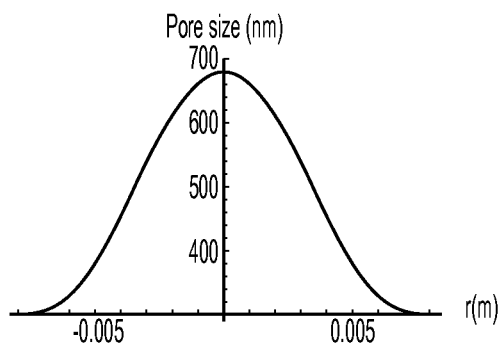
FIGS. 3a-3c are graphs showing the detailed calculations of pore size distributions for the elastic microfiltration membrane of the present disclosure for use with a perforated support member having circular and square openings of FIGS. 2a and 2b.
Figure 3B:
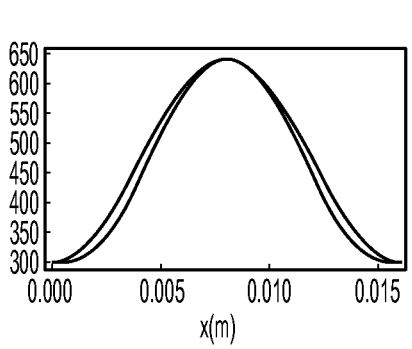
Figure 3C:
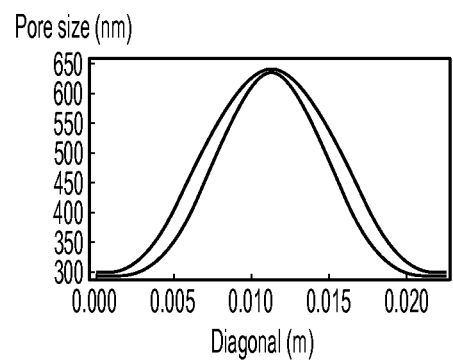

The detailed calculations of pore size distributions for the above circular and square openings on the perforated support member, are set forth in FIGS. 3a-3c. Assuming that the trans membrane pressure is 50 Pa, the diameter of circular frame is 1.6 cm and the edge length of the square grid is 1.6 cm, the pore size distributions of the elastic membrane were calculated. FIG. 3a shows the cross-section view of pore size distribution of the membrane with a perforated support member having circular openings. FIGS. 3b and 3c show the pore size distributions of membrane with a perforated support member having square openings with cross-section planes passing through the line y=0.008 mm (FIG. 3b) and the line y=x (diagonal line) (FIG. 3c), respectively.

As noted above, various designs may be used for the perforated support members encasing the membranes of the present disclosure. Suitable shapes for openings on these perforated support members include, for example, circular, square and hexagonal. Depending on the desired application, the number and size of the openings on the perforated support member may be adjusted. For example, FIG. 4 shows exemplary perforated support members 12c having square openings 22.

Figure 4:
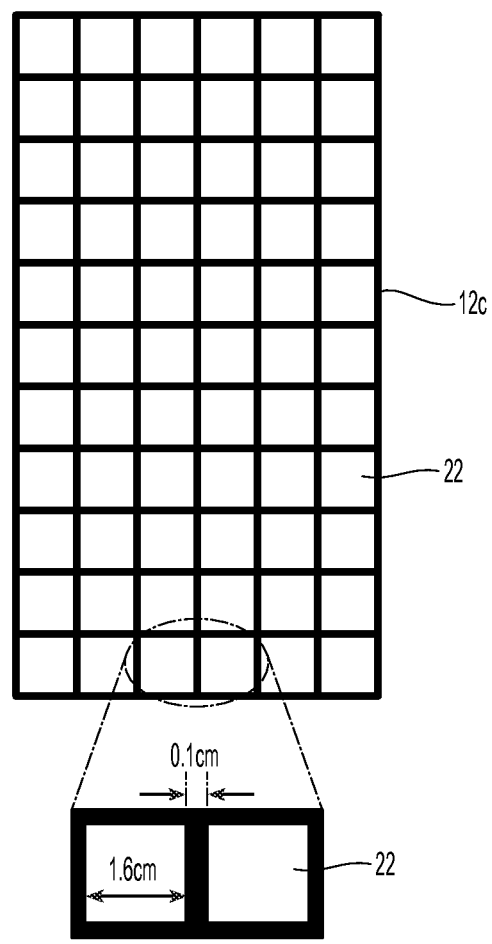
FIG. 4 is a perforated support member having square openings suitable for use in forming a membrane module of the present disclosure.

For the perforated support member 12c in FIG. 4 having square openings 22,
Edge length: 1.6 cm
Inter-grid space: 0.1 cm
For a metal sheet with dimensions of 51.1 cm (wide)× 159.9 cm (tall), there will be 30 columns and 94 rows of square empty spacings. The ratio of empty spacing area over the total area is:

$$\frac{1.6 \times 1.6 \times 30 \times 94}{51.1 \times 159.9} \times 100\% = 88.4\%$$

Figure 5:
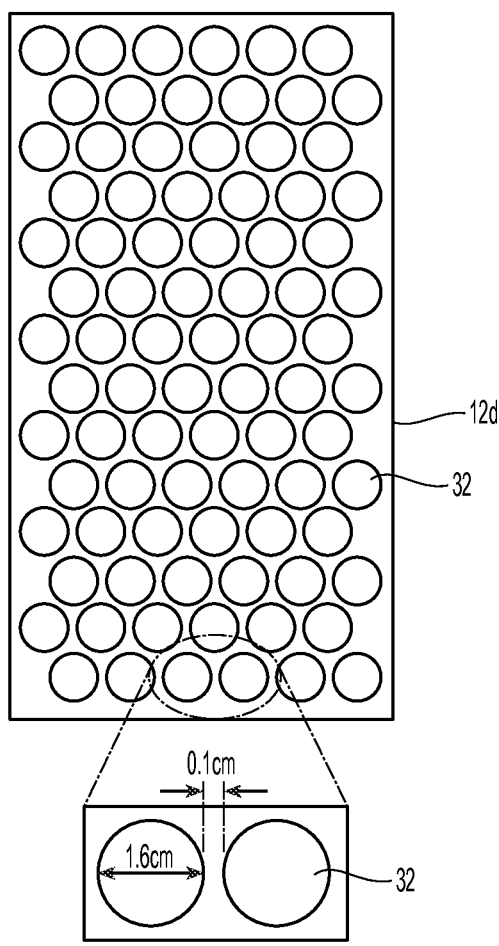
FIG. 5 is a perforated support member having circular openings suitable for use in forming a membrane module of the present disclosure.

FIG. 5 shows exemplary perforated support members 12d having circular openings 32. For the perforated support member 12d in FIG. 5 having circular openings 32,
Diameter: 1.6 cm
Inter-circle space: 0.1 cm
For a metal sheet with dimensions of 50.25 cm (wide)× 160.56 cm (tall), there will be 29 columns and 109 rows of circular empty spacings. The ratio of empty spacing area over the total area is:

$$\frac{\pi \times 0.8^2 \times 29 \times 109}{50.25 \times 160.56} \times 100\% = 78.8\%$$

Figure 6:
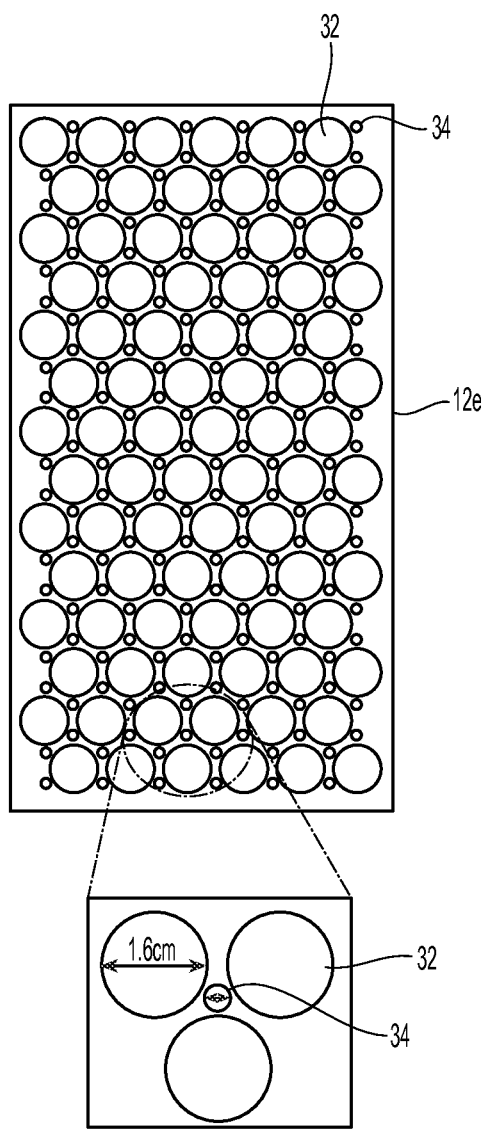
FIG. 6 is a perforated support member having circular openings of different sizes, suitable for use in forming a membrane module of the present disclosure.

An alternate configuration is set forth in FIG. 6, where the perforated support member 12e possesses circular openings 32, with smaller circles 34 placed between larger circles 32. As seen in FIG. 6, the space between the large circles 32 can be filled with small circles 34 with diameter of 0.26 cm, which will make the edge-to-edge distance between the large and small circles 0.05 cm.

However, since the deformation of the thin membrane is sensitive to the frame size, for a membrane clamped on a frame with circular openings having a diameter of 0.26 cm, if the pressure is still 50 Pa, the maximum protrusion length (at the center of the circle) is only 0.0003 cm, and the maximum in-plane strain is only 0.0024%.

Figure 7:
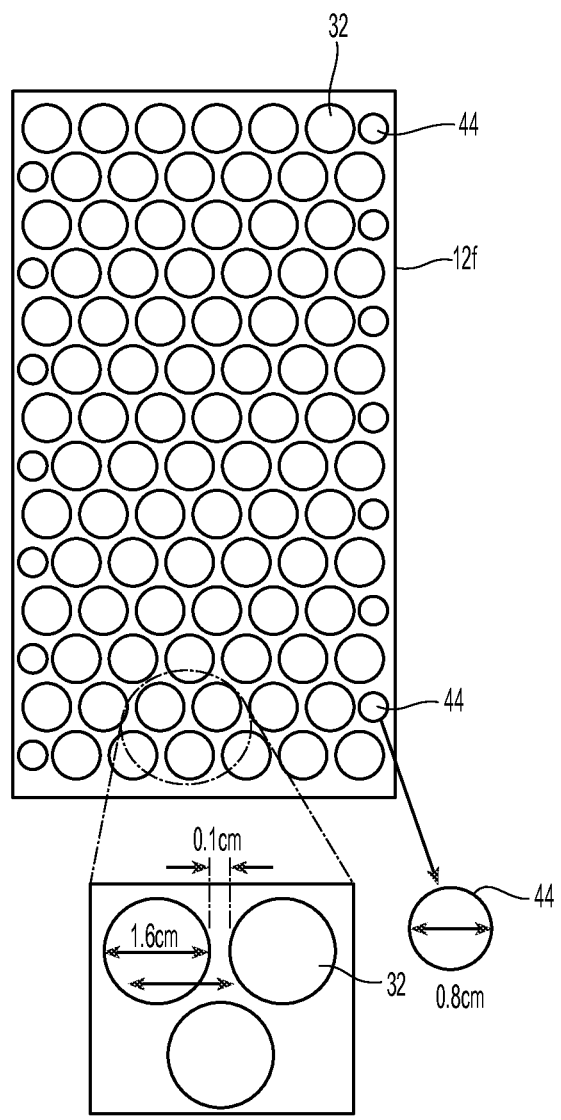
FIG. 7 is an alternate perforated support member having circular openings of different sizes, suitable for use in forming a membrane module of the present disclosure.

FIG. 7 depicts an alternate configuration of the perforated support member 12f with smaller circles 44 interspersed with larger circles 32. As seen in FIG. 7, the space at the end of each circle row can be filled with smaller circles 44 with diameter of 0.8 cm, and the edge-to-edge distance between the large circles 32 and small circles 44 is 0.05 cm.

For a membrane clamped on a perforated support member having circular openings with a diameter of 0.8 cm, if the pressure is still 50 Pa, the maximum protrusion length (at the center of the circle) is 0.028 cm, and the maximum in-plane strain is only 2%.

In this case the ratio of empty spacing area over the total area is:

$$\frac{\pi \times 0.8^2 \times 29 \times 109 \div \pi \times 0.4^2 \times 109}{50.25 \times 160.56} \times 100\% = 79.4\%$$

Compared to the perforated support member before spacing filling, the empty spacing area over the total area ratio increased less than 1% (79.4%−78.8%=0.6%).

Figure 8:
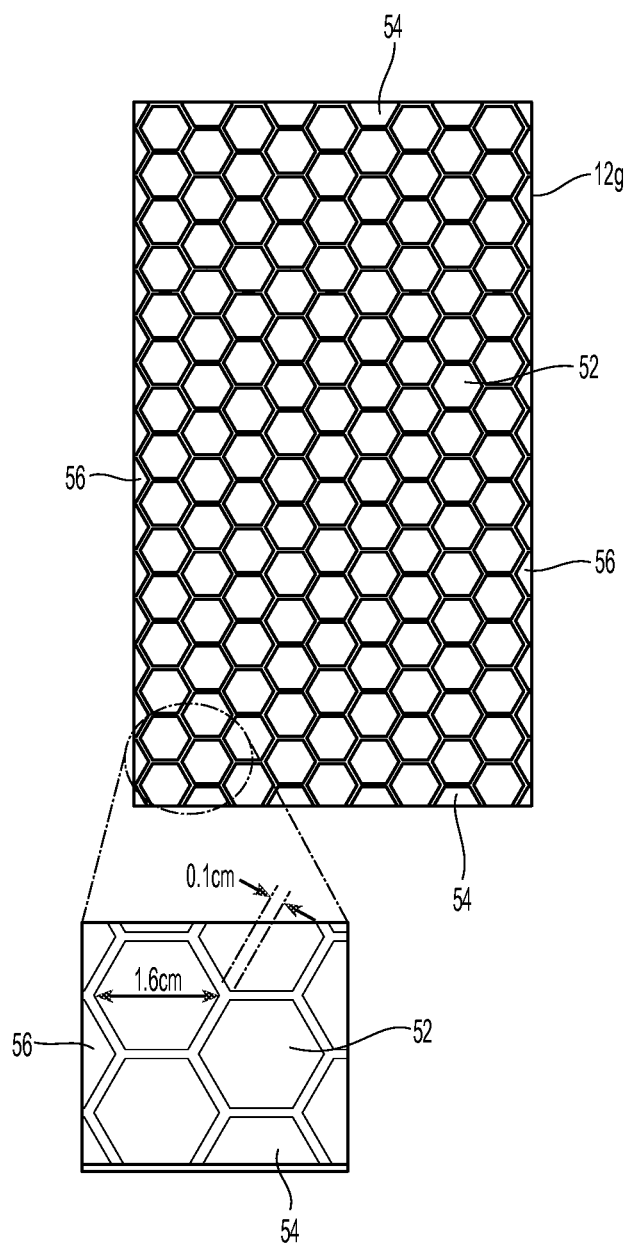
FIG. 8 is a perforated support member having hexagonal openings suitable for use in forming a membrane module of the present disclosure.

FIG. 8 includes examples of perforated support members 12g having hexagonal openings 52. As can be seen for the perforated support members 12g having hexagonal openings 52 of FIG. 8, Diameter: 1.6 cm
Inter-grid space: 0.1 cm For a metal sheet with dimensions of 50.66 cm (wide)× 160.53 cm (tall), there will be 4193 empty hexagonal openings. The ratio of empty spacing area over the total area is:

$$\frac{4193 \times 1.663}{50.25 \times 160.56} \times 100\% = 85.74\%$$

If the half-hexagon spaces 54 along the top and bottom edges of perforated support member 12g were also processed into openings, the ratio of empty spacing area over the total area is:

$$\frac{4193 \times 1.663 \div 38 \times \frac{1}{2} \times 1.663}{50.25 \times 160.56} \times 100\% = 86.13\%$$

Further, if the triangle spaces 56 along the left and right edges of perforated support member 12g were also processed into openings, the ratio of empty spacing area over the total area is:

$$\frac{4193 \times 1.663 \div 38 \times \frac{1}{2} \times 1.663 \div 214 \times \frac{1}{6} \times 1.663}{50.25 \times 160.56} \times 100\% = 86.86\%$$

Figure 9:
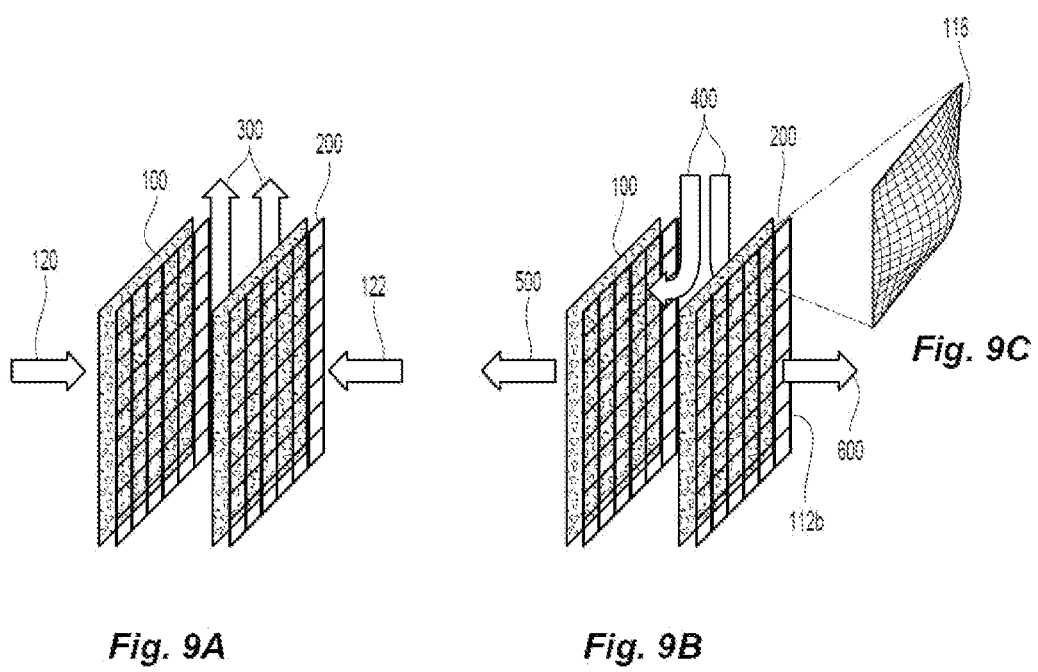
FIGS. 9a-9c are depictions of a membrane module in use as a membrane bioreactor, including filtration (FIG. 9a) and backwashing (FIG. 9b)

As noted above, a membrane module for use with an MBR includes 2 metal perforated support members, a non-woven substrate and an elastic microfiltration membrane. Each membrane module is a box 100, 200, with the elastic microfiltration membranes installed on the opposite faces of the box facing the feeding directions 120, 122 of the mixed liquor, as depicted in FIGS. 9a-9c. FIG. 9a is a sketch diagram of the filtration process with the novel elastic microfiltration membrane of the present disclosure with effluent 300 passing away from membrane modules 100, 200. FIG. 9b is a sketch diagram of the backwashing process using a novel elastic microfiltration membrane of the present disclosure showing passage of backwash 400 through membranes 100, 200 as effluent 500, 600. FIG. 9c is an enlarged view of the elastic microfiltration membrane 116 of the present disclosure protruding through a perforated support member 112b encasing the elastic microfiltration membrane 116 during the backwash process (the lines on the surface of the deformed elastic microfiltration membrane 116 indicate the deflection of the elastic microfiltration membrane, not the electrospun fibers used to form the elastic microfiltration membrane).

After the filtration, clean water drains out from the top of the unit box as effluent 300.

As shown in FIG. 9a, during the filtration process, the membrane module works with the same filtration mechanism as existing commercial membrane modules, because the supporting substrate of the relatively dense non-woven substrate limits the strain of the elastic microfiltration membrane. In view of the purpose of thorough cleaning of the membrane module during the backwash process, the non-woven layer may be made of polyester elastic fabrics, but the elasticity is much less than that of the elastic microfiltration membrane. For the backwash cleaning process (FIG. 9b), the direction of the water flow is reversed, in which case, the pressure of the water flow will first pass through the non-woven substrate and then apply on the elastic microfiltration membrane. Under pressure, the elastic microfiltration membrane will deform and protrude through the edges of the perforated support members (FIG. 9c).

A novel membrane bioreactor (MBR) system assembled with elastic microfiltration (MF) membranes of the present disclosure has greatly improved fouling removal efficiency, due to higher porosity and larger pore sizes during the backwash process, through the deformation of the elastic membrane under predesigned pressure. During the filtration process, the deformation of the elastic membrane is effectively minimized due to the use of the layer of dense non-woven substrate. For cleaning, while in the backwash mode, the reverse pressure can be utilized to increase the pore sizes of the membrane in a controlled manner with the use of the metal perforated support members. Therefore, the filtration performance, including flux rate and rejection ratio, will not be influenced substantially by the elasticity of the membrane. Moreover, while in the backwash mode, the particles lodged in the membrane can be washed out due to a measured increase in the pore size of the membrane.

Since the pore size of the elastic microfiltration membrane will increase along with the dramatic expansion of the elastic microfiltration membrane surface, the fouling particles, which got stuck inside the pores of the elastic microfiltration membrane during the filtration, can be flushed out when the pores are enlarged. For the actual filtration process, the membrane module will be kept working in cycles of a period for filtration (e.g., 54 minutes filtration) followed by a short relaxation period (e.g., 1 minute relaxation for switch over), and then a period of backwash (e.g., 4 minutes backwash) and another short relaxation period (e.g., 1 minute relaxation for switch over) every hour. The periodical backwash cleaning of the elastic microfiltration membrane should significantly reduce fouling, which has always been a difficult problem with the application of the MBR technique. The periods of washing, relaxation and backwash, as well as the pressures used, depend on the nature of the filtrate and impurities involved.

Compared to the existing submerged flat sheet membrane technology for MBR systems, the MBR modules of the present disclosure, including elastic microfiltration membranes of the present disclosure, can have significantly higher fouling removal efficiency during the backwash process, while at the same time, the high flux nature from the fibrous format should make this combination a breakthrough combination for MBR membranes.

In accordance with the present disclosure, the (electrospun) elastic MF membranes with highly reversible elongation rate (in embodiments, over 500%, which is much more than needed), may be employed. The pore size of the elastic microfiltration membrane can be enlarged along with the elastic microfiltration membrane deformation during the backwash process, which should facilitate the effective removal of the lodged foulants from the elastic microfiltration membrane. In addition, the pore sizes are adjustable depending on the applied trans-membrane pressure (TMP). By abating the accumulation of irremovable foulants, either no chemical cleaning or less chemical cleaning is required for elastic microfiltration membranes of the present disclosure, which will be helpful to increase the service life of the elastic microfiltration membrane and to reduce the disposal of toxic and caustic spent chemicals used in the cleaning process.

The following Example is being submitted to illustrate embodiments of the present disclosure. The Example is intended to be illustrative only and are not intended to limit the scope of the present disclosure. Also, parts and percentages are by weight unless otherwise indicated. As used herein, "room temperature" refers to a temperature of from about 20° C. to about 30° C.

Example

An elastic microfiltration membrane was prepared using polyether-based thermoplastic polyurethane elastomer (TPU) (HydroThane AL 25-80A, AdvanSource Biomaterials Corp., USA). Specifically, TPU pellets were dissolved in a mixture of dimethylacetamide (DMAc) and tetrahydrofuran (THF) (90/10, w/w) at room temperature, with stirring to a concentration of 9 wt %. The TPU solution was electrospun at 16.4 kV by using an automatic electrospinning instrument, having a metallic spinneret, a syringe pump, a high-voltage power supply, and a translational collector. The feeding rate of the TPU solution was 25 µl/min, the spinneret diameter was 0.7 mm, and the working distance between the collector and the spinneret was 10 cm. The electrospun fibers were collected by a piece of aluminum foil, which was adhered to a rotating metal drum with a diameter of 9 cm and a rotating speed of 300 rpm. A stepping motor was used to control the translational motion of the spinneret in the direction that is perpendicular to the drum rotation direction in order to ensure the production of a uniform membrane.

Figure 10:
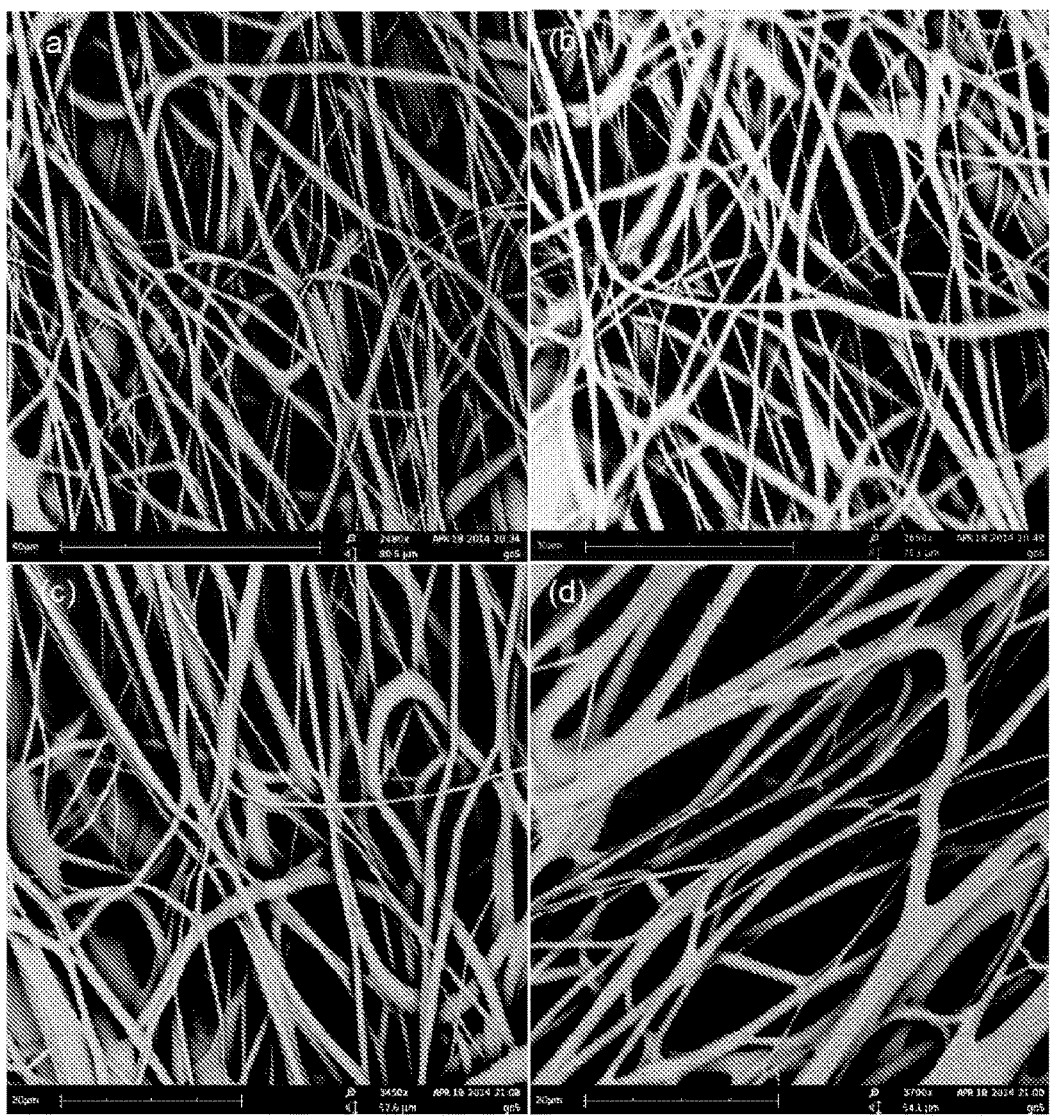
FIGS. 10a-10d are scanning electron microscope (SEM) images showing the morphology of electrospun thermoplastic polyurethane elastic microfiltration membranes of the present disclosure.

The morphology of the electrospun TPU elastomer membrane thus produced was observed by scanning electron microscope (SEM), with the results set forth in FIGS. 10a-10d, and the diameters of the electrospun fibers ranged from 200 nm to 1.7 µm. FIGS. 10a, 10b, and 10c are from membranes without distortion, and FIG. 10d is from a membrane stretched with uniaxial elongation of about 100%. The scale bar lengths shown in the images are 40 µm in FIG. 10a, 30 µm in FIG. 10b, 20 µm in FIG. 10c, and 20 µm in FIG. 10d.

Figure 11:
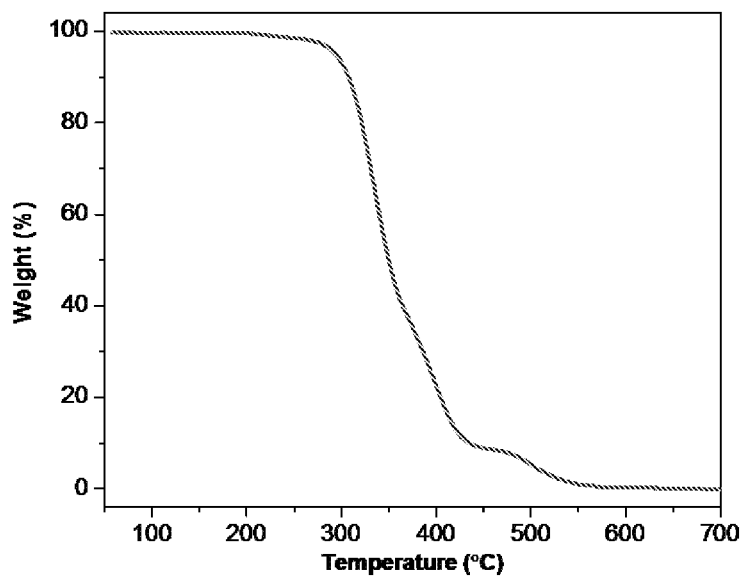
FIG. 11 is a graph showing the results of thermogravimetric analysis (TGA) of a thermoplastic polyurethane elastic microfiltration membrane of the present disclosure.
Figure 12:
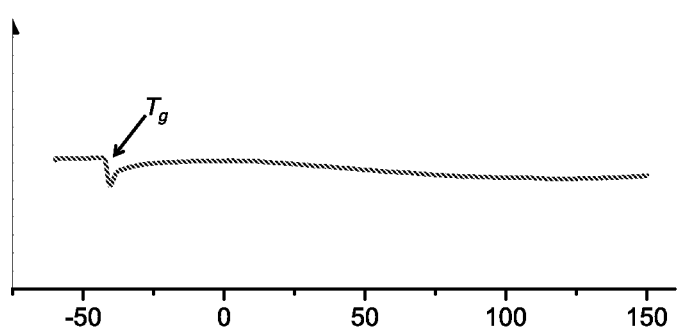
FIG. 12 is a graph showing the results of differential scanning calorimetry (DSC) of a thermoplastic polyurethane elastic microfiltration membrane of the present disclosure, showing its glass transition temperature (Tg).

The thermal stability of the TPU membrane was evaluated by using thermogravimetric analysis (TGA), with the results set forth in FIG. 11. The material did not show any degradation before the temperature was increased to about 325° C. The glass transition temperature (Tg) of the electrospun membrane was determined to be around −40° C. by using differential scanning calorimetry (DSC), with the results set forth in FIG. 12.

It will be understood that various modifications may be made to the embodiments disclosed herein. Therefore, the above description should not be construed as limiting, but merely as an exemplification of preferred embodiments. Those skilled in the art will envision other modifications within the scope and spirit of the present disclosure. Such modifications and variations are intended to come within the scope of the following claims.

What is claimed is:

1. A membrane module for use with a membrane bioreactor, the membrane module comprising:
   a first perforated metal support member;
   a non-woven substrate adjacent the first perforated metal support member;
   an elastic microfiltration membrane adjacent the non-woven substrate, the elastic microfiltration membrane formed of polyether-based thermoplastic polyurethanes, polyester-based thermoplastic polyurethanes, polycaprolactone-based thermoplastic polyurethanes, polyether block amides, polyetherimides, silicone rubber, poly(styrene-butadiene-styrene), polybutadiene rubber, or combinations thereof; and
   a second perforated metal support member adjacent the elastic microfiltration membrane,
   wherein openings of the first perforated metal support member are larger than openings of the second perforated metal support member.

2. The membrane module of claim 1, wherein the non-woven substrate includes a polymer selected from the group consisting of polyethylene, polypropylene, polyethylene terephthalate, polytrimethylene terephthalate, and polybutylene terephthalate, nylon 6, nylon 66, nylon 12, polyurethanes, fluorinated polymers, polyetherketones, polystyrene, sulfonated polyetherketones, sulfonated polystyrene, cellulose, derivatives thereof, and copolymers thereof.

3. The membrane module of claim 1, wherein the non-woven substrate includes polyethylene terephthalate.

4. The membrane module of claim 1, wherein the non-woven substrate has a thickness from about 20 µm to about 1000 µm.

5. The membrane module of claim 1, wherein the elastic microfiltration membrane includes a polyether-based thermoplastic polyurethane.

6. The membrane module of claim 1, wherein the elastic microfiltration membrane has a thickness from about 20 µm to about 800 µm.

7. The membrane module of claim 1, wherein the elastic microfiltration membrane has pores possessing average sizes from about 100 nm to about 1.5 µm in diameter.

8. The membrane module of claim 1, wherein the elastic microfiltration membrane has fibers having a mean fiber diameter from about 40 nm to about 500 nm.

9. The membrane module of claim 1, wherein the elastic microfiltration membrane has a Young's modulus from about 0.01 MPa to about 50 MPa.

10. The membrane module of claim 1, wherein the first perforated metal support member, the second perforated metal support member, or both, possess square openings.

11. The membrane module of claim 1, wherein the first perforated metal support member, the second perforated metal support member, or both, possess circular openings.

12. The membrane module of claim 1, wherein the first perforated metal support member, the second perforated metal support member, or both, possess hexagonal openings.

13. A membrane bioreactor including at least one membrane module of claim 1.

* * * * *